US005475916A

United States Patent [19]

Schollenberger

[11] Patent Number: 5,475,916

[45] Date of Patent: Dec. 19, 1995

[54] MACHINE FOR STAKING A TWO PART CONNECTOR HOUSING TOGETHER

[75] Inventor: Marlin R. Schollenberger, Myerstown, Pa.

[73] Assignee: The Whitaker Corporation, Wilmington, Del.

[21] Appl. No.: 342,941

[22] Filed: Nov. 21, 1994

[51] Int. Cl.[6] .......................... B23P 19/04; H01R 43/18; H01R 43/26

[52] U.S. Cl. .......................... 29/747; 29/267; 29/758; 29/760

[58] Field of Search .......................... 29/33 AA, 231, 29/257, 276, 747, 758, 759, 760, 761, 754, 267

[56] References Cited

U.S. PATENT DOCUMENTS

| | | | |
|---|---|---|---|
| 2,613,434 | 10/1952 | Martin | 29/231 |
| 3,416,214 | 12/1968 | Clark | 29/257 X |
| 4,393,580 | 7/1983 | Hall, Jr. | 29/760 X |
| 4,765,059 | 8/1988 | Pearce | 29/749 |
| 5,222,292 | 6/1993 | Comerci et al. | 29/758 X |

FOREIGN PATENT DOCUMENTS

| | | | |
|---|---|---|---|
| 134984 | 6/1991 | Japan | 29/760 |
| 5152360 | 6/1993 | Japan | 29/760 |
| 596408 | 3/1978 | U.S.S.R. | 29/760 |

*Primary Examiner*—Peter Vo

[57] ABSTRACT

A machine (10) is disclosed for staking a multi-part connector housing together. The machine includes upper and lower die assemblies (26, 30) that are brought into engagement by means of a manually actuated ram (18). The connector and cable assembly (12) to be staked is held between a lower die nest (98) and an upper die face (130) that are spring biased toward each other. Lower staking pins (82, 84) are fixed with respect to the base (16) of the machine while upper staking pins (142) are fixed with respect to the ram (18). As the ram moves toward the base, the lower die nest (98) and upper die face (130), as well as the connector move downwardly toward and into staking engagement with the lower staking pins (82, 84). Concurrently, the upper staking pins (142) move toward and into staking engagement with the upper side of the connector.

9 Claims, 5 Drawing Sheets

MACHINE FOR STAKING A TWO PART CONNECTOR HOUSING TOGETHER

The present invention relates to a machine for staking a multi-part connector housing together wherein the parts each have staking members that extend through openings in the other parts, and more particularly, where the parts must be held together while the staking members are concurrently engaged and staked from opposite sides of the connector housing.

BACKGROUND OF THE INVENTION

Electrical connectors having housings that are made of more than one piece where the pieces interengage and are staked together, are either assembled in a complex and expensive machine, or are assembled by hand and staked in a manually operated press, one stake position at a time. For example, one type of connector housing is composed of two outer shells or halves, each of which have pins that project through holes in the other half. The two halves are manually assembled and placed in an arbor press, having appropriate staking tooling. The first pin is then aligned with the tooling and the press operated to stake the pin, then each pin in turn is similarly staked. This, of course, is cumbersome and inefficient and requires that the operator be able to consistently align the pin to be staked accurately with the tooling. Such a procedure is useful only with very small production runs or for single units. For medium sized production runs, where the large automated machine is too expensive, a smaller and less expensive alternative is desirable.

What is needed is a simple manually operated tool that will hold the two housing halves together and accurately stake all of the pins on each side of the connector simultaneously with a single stroke of the press by the operator.

SUMMARY OF THE INVENTION

A machine is disclosed for staking two parts of an electrical connector together. The machine has a frame, a base surface attached to the frame, and a ram coupled to the frame arranged for undergoing reciprocating motion along an axis toward and away from the base surface. The staking tooling includes an upper die coupled to and carried by the ram, biased toward the base surface by a first resilient member, and a lower die coupled to the base surface, biased toward the ram by a second resilient member. A nest is formed in a surface of the lower die facing the ram for receiving and positioning the two parts of the electrical connector. An upper staking pin is coupled to and carried by the ram. A lower staking pin is coupled to and stationary with respect to the base surface. When the two parts of the electrical connector are assembled and placed in the nest, one part is an upper part facing the ram and the other part is a lower part in engagement with the nest. The staking tooling is arranged so that when the ram is moved toward the base surface, the upper die engages the upper part urging the upper die toward the ram and the lower die toward the base surface, thereby deflecting the first and second resilient members. The upper and lower parts of the connector are held between the upper and lower dies by the urging of the resilient members. The upper staking pin engages and stakes a portion of the lower part of the connector and concurrently the lower staking pin engages and stakes a portion of the upper part of the connector.

DESCRIPTION OF THE PREFERRED EMBODIMENT

Figure 1:
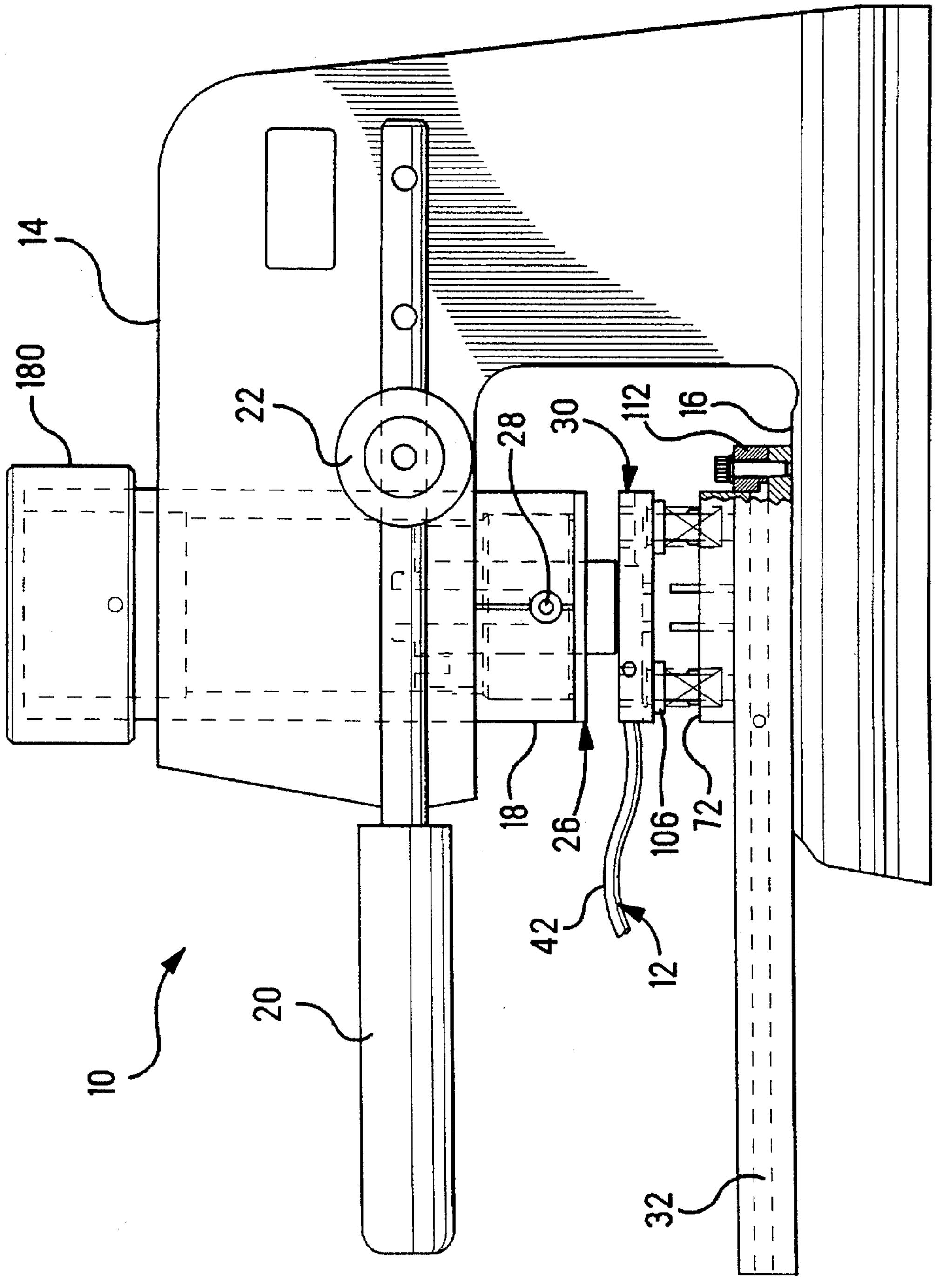
FIG. 1 is a side view of a machine for staking two parts of a multi-part connector together.
Figure 2:
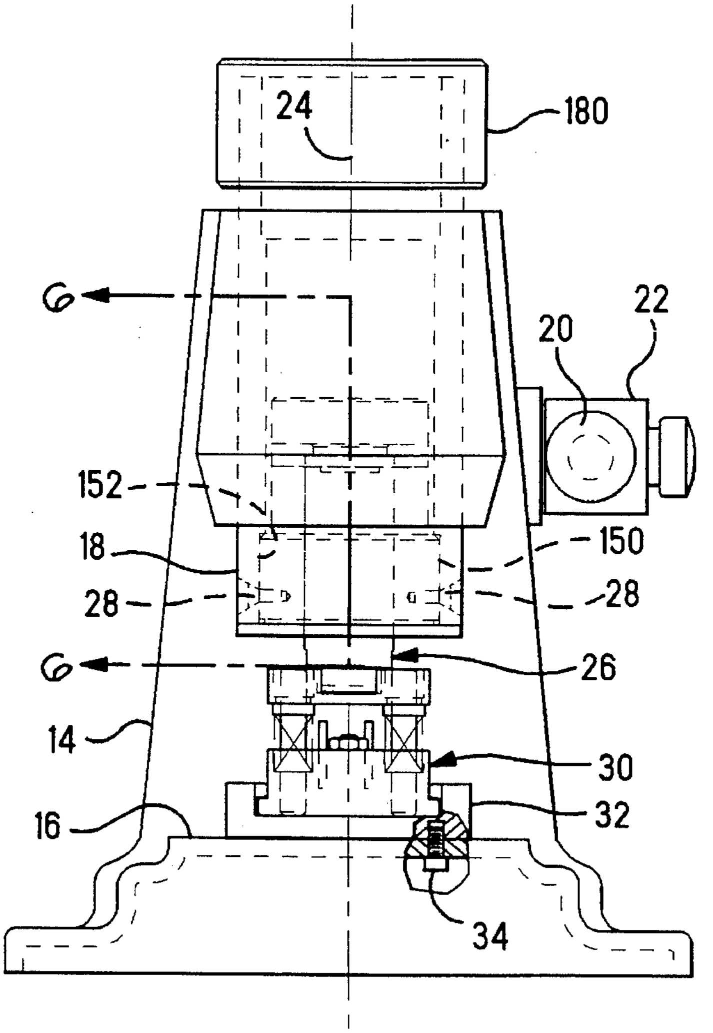
FIG. 2 is a front view of the machine shown in FIG. 1.

There is shown in FIGS. 1 and 2 a machine 10 for staking two housing parts together of a multi-part connector and cable assembly 12. The machine includes a frame 14 having a base surface 16, to which tooling may be secured, and a ram 18 arranged within the frame to undergo reciprocating motion toward and away from the base surface 16. A manually actuated handle 20 is coupled to a shaft by a coupling 22 and is arranged to rotate the shaft and an attached gear that is in engagement with a rack gear in the side of the ram, for effecting the reciprocating motion of the ram along an axis 24. Note that the shaft and rack gear are not shown, however, such structures are well known in the industry. An upper die assembly 26 is coupled to the ram 18 by means of two screws 28, as shown in FIG. 2, that are threaded into the upper die assembly. A lower die assembly 30 is slidingly coupled to the base surface 16 by means of a slide 32 that is secured to the base surface by four screws 34.

Figure 3:
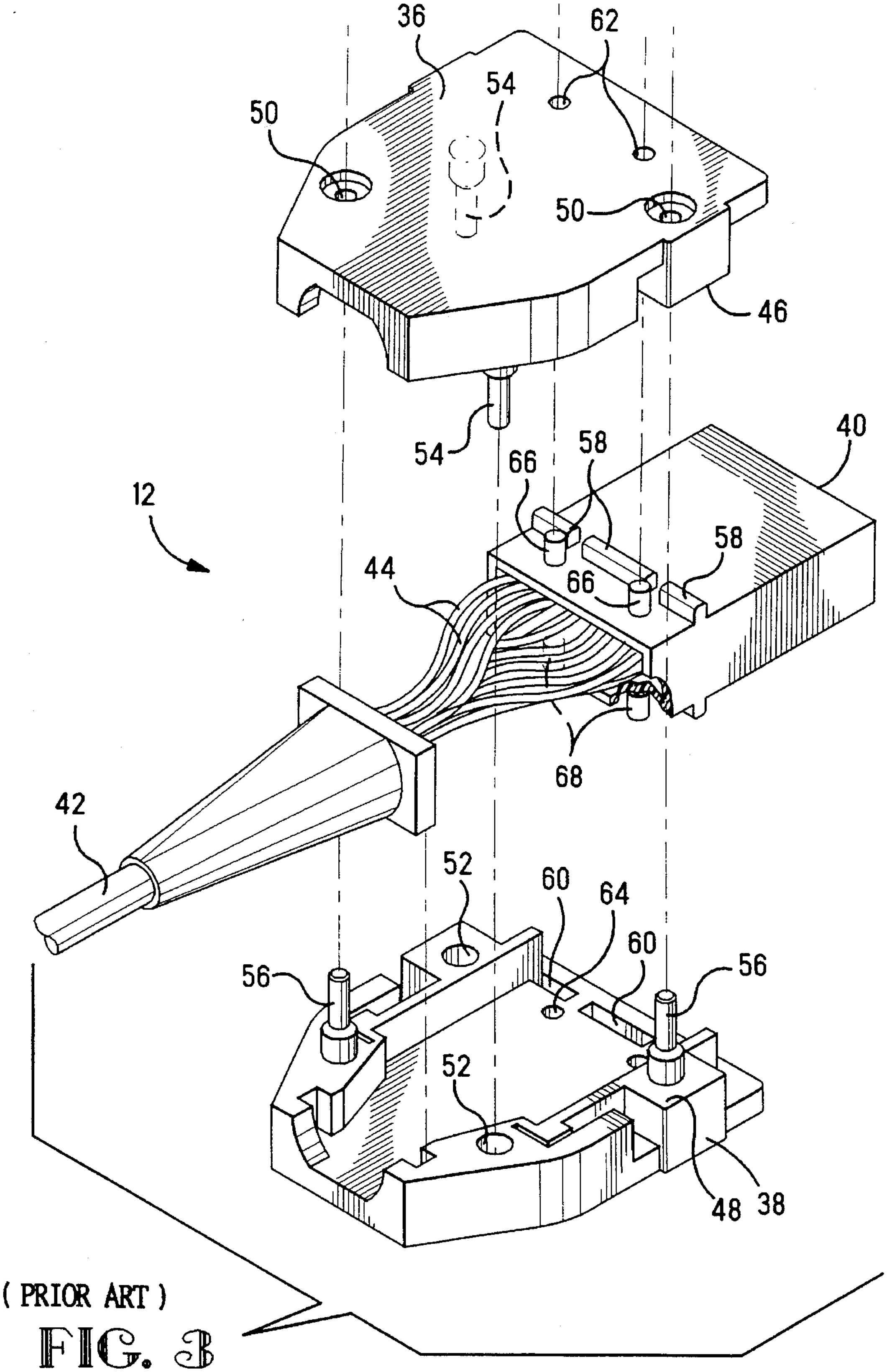
(PRIOR ART) FIG. 3
FIG. 3 is an exploded parts view of a typical electrical connector and cable assembly having a multi-part housing.

The connector and cable assembly 12, as best seen in FIG. 3, includes a top housing shell 36 and a mating bottom housing shell 38, and a center housing portion 40 that contains the electrical contacts. A cable 42 has individual conductors 44 that are terminated to the electrical contacts, not shown, in the center housing portion 40. The two housing shells 36 and 38 are mated along mating surfaces 46 and 48, respectively. The housing shell 36 has two holes 50 and the housing shell 38 has two holes 52, formed through and perpendicular to their respective mating surfaces. Additionally, the housing shell 36 has two pins 54 and the housing shell 38 has two pins 56, extending from and perpendicular to their respective mating surfaces. The pins 54 and 56 are molded along with the molding of the housing shells, or if of different material, are insert molded with the housing shells. In any case, the pins 54 and 56 and the holes 50 and 52 are positioned so that as the upper and lower housing shells 36 and 38 are mated, the pins 54 enter into the holes 52 and the pins 56 enter into the holes 50, the pins extending completely through the opposite housing shell and beyond a small amount. The portion of each of the pins that extends beyond its respective mating housing shell is to be deformed or staked so that it cannot retreat back into its hole, thereby securing the two housing shells tightly together. In the present example, the center housing portion 40 includes three ribs 58 on each side that extend into and latch with three grooves 60 in each of the two housing shells 36 and 38. Two holes 62 are formed through the top housing shell 36 and two holes 64 are formed through the bottom housing shell 38, adjacent their respective grooves 60. A pair of pins 66 extend from the upper side of the center housing portion 40 and a pair of pins 68 extend from the lower side thereof, each pin in alignment with a respective hole 62 or 64 so that when the two housing shells and the center housing portion are assembled, the pins 66 and 68 extend through their respective holes 62 and 64 a slight amount. The portion of each of the pins 64 that extends beyond the outer surface of its respective mating housing shell is to be deformed or staked so that it cannot retreat back into its hole, thereby securing the center housing portion to the two mated housing shells and aiding in securing the two housing shells together. Note that the holes 50, 52, 62, and 64 are counterbored slightly into the outside surfaces of the two housing shells so that the deformed portions of the pins 54, 56, 66, and 68 will be either flush with or below the outside surfaces of the housing shells.

Figure 4:
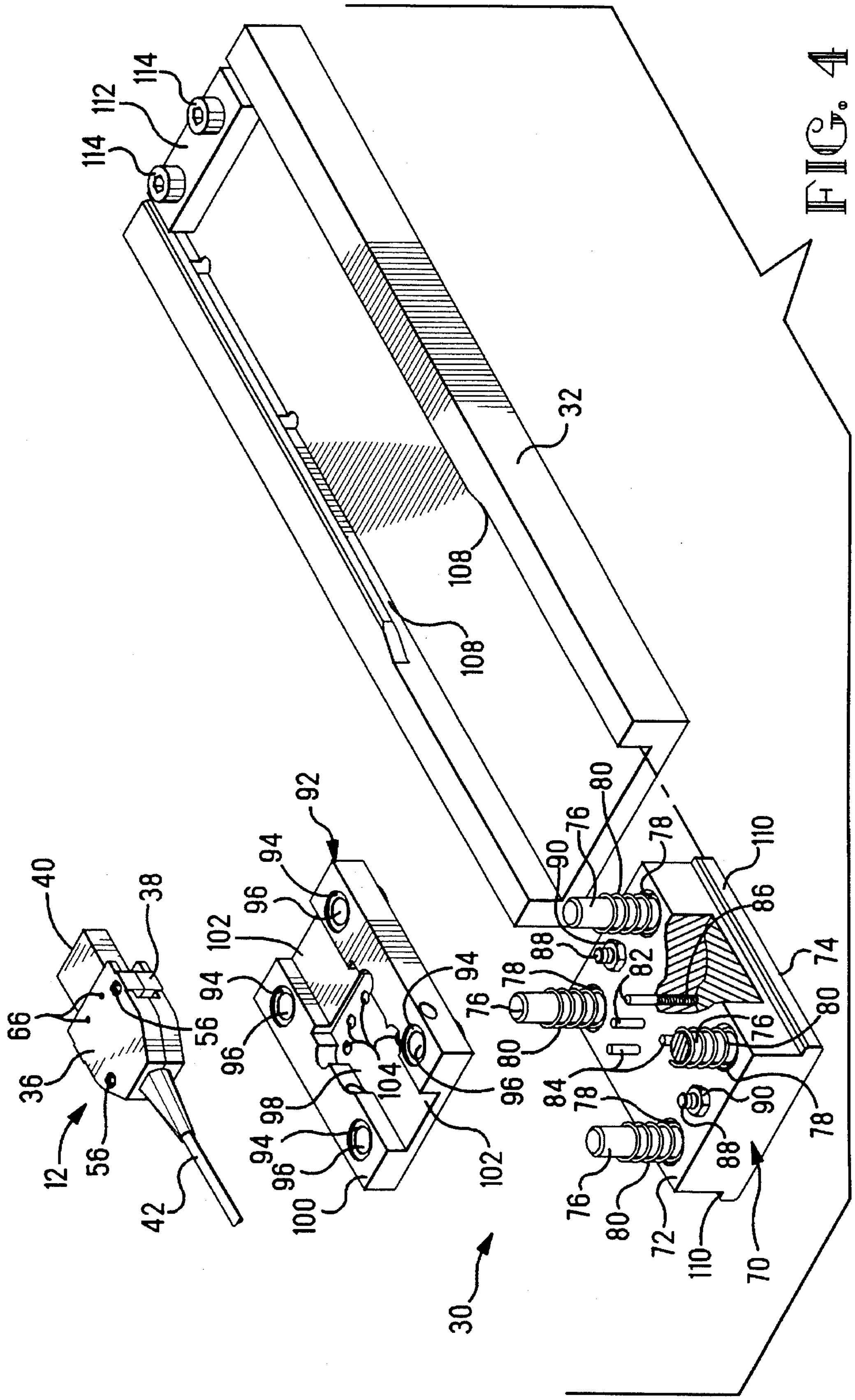
FIG. 4 is an exploded parts view of the lower die and slide shown in FIGS. 1 and 2.

The lower die assembly 32, as best seen in FIG. 4, includes a die support 70 having top and bottom parallel surfaces 72 and 74, respectively. Four guide pins 76 are tightly pressed into holes in the die support and extend upwardly from and perpendicular to the top surface 72. Each of the guide pins is surrounded by a counterbore 78 that extends into the surface 72 a short distance. Four compression springs 80 are arranged, one spring around each guide pin so that each spring is nestled in a respective counterbore 78, the counterbores being deep enough to accommodate the entire length of the springs when fully compressed. Two staking pins 82 and two staking pins 84 are lightly pressed into holes in the die support and extend upwardly from and perpendicular to the top surface 72. The two staking pins 82 are spaced to conform to the spacing of the pins 68 of the center housing portion, see FIG. 3, while the two staking pins 84 are spaced to conform to the spacing of the pins 54 of the top housing shell 36. The light press fit of the staking pins 82 and 84 allows the height of the pins from the surface 72 to be adjusted. Each pin 82 and 84 is backed up with a set screw 86 that is threaded into a hole formed in the bottom surface 74 in alignment with each of the pins, as shown in FIG. 4. The height of each pin is adjusted by backing out the set screw and tapping the pin downwardly until it bottoms against the set screw. The set screw is then turned inwardly against the bottom of the pin causing the pin to move up in its hole so that the tip extends above the surface 72 the desired amount. As shown in FIG. 4, the lower die assembly includes a die nest 92 having four bushings 94 pressed into holes formed therein in alignment with the four guide pins 76 in the die support. The bushings have bores 96 that are a slip fit with the guide pins 76 so that when the die nest is assembled to the die support 70, as shown in FIGS. 1 and 2, the guide pins 76 are disposed within the bores 96 and the die nest is free to move vertically with respect to the die support 70. A cavity 98 is formed in a surface 100 of the die nest 92 for receiving the connector and cable assembly 12 and accurately positioning the connector for staking. A clearance slot 102 extends into the surface 102 for the length of the die nests intersecting the cavity 98 to provide clearance for the cable and the center housing portion 40. Four clearance holes 104 are arranges in alignment with the two pairs of pins 82 and 84 so that each pin extends through a respective clearance hole. The tips of the pins extend into the cavity 98 a specific amount when the die nest 92 is urged downwardly, thereby compressing the springs 80 so that the heads 106 of the bushings 94 are against the top surface 72 of the die support 70. The lower die assembly 30 is coupled to the base surface 16 of the machine 10 by means of a slide 32 that is tightly bolted to the surface 16 with the screws 34. The slide 32 includes ways 108 that slidingly receive a pair of flanges 110 extending from opposite sides of the die support 70 adjacent the surface 74. A stop block 112 is attached to the end of the slide 32 by means of two screws 114 and serves to align the lower die assembly with the ram 18, This permits the operator to slide the lower die assembly 30 out from under the ram and into the open so that the connector and cable assembly 12 can be easily positioned in the tooling. The lower die assembly may then be moved back against the stop block 112 to its original position in alignment with the ram 18, ready for staking.

Figure 6:
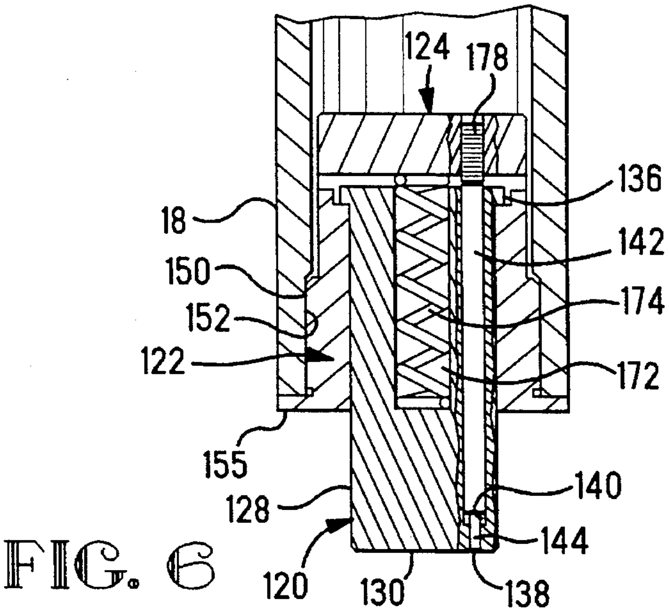
FIG. 6 is a cross-sectional view taken along the lines 6—6 of FIG. 2.
Figure 5:
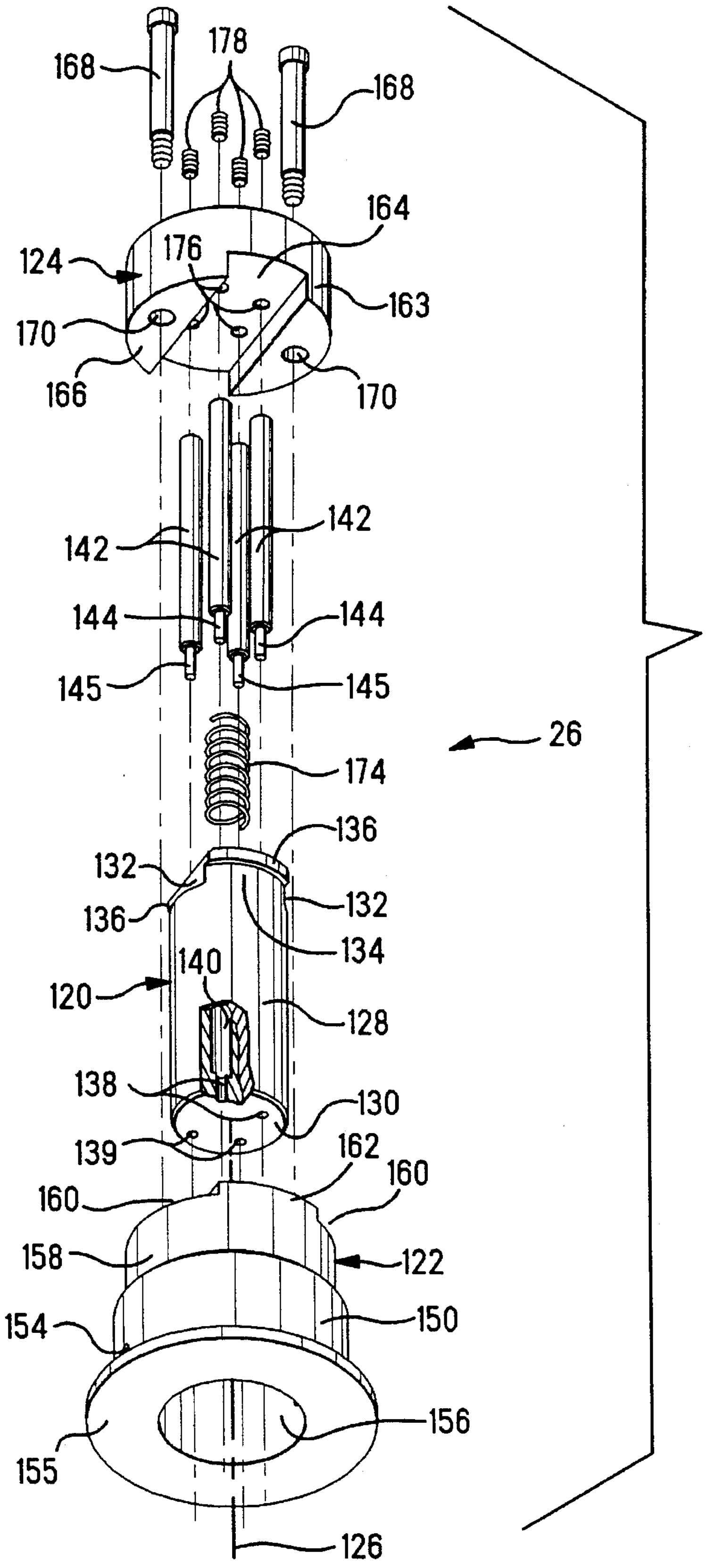
FIG. 5 is an exploded parts view of the upper die shown in FIGS. 1 and 2.

The upper die assembly 26, as shown in FIG. 5, includes a die 120 , a sleeve mount 122, and an end cap 124. The die 120 is cylindrical in shape having a longitudinal axis 126 an outer diameter 128, and a connector engaging face 130. A pair of cutouts 132 are formed on opposite sides of the end of the die 120 opposite the face 130 thereby forming a shank 134. Each side of the shank 134 has two flanges 136 that extend outwardly from the diameter 128 a short distance. Two holes 138 and two holes 139 are formed through the face 130 of the die 120 with their axes parallel to the axis 126 and have counterbores 140 extending from the shank end of the die, for receiving four staking rods 142. Two of the staking rods each includes a reduced diameter tip 144 that is a slip fit with a respective hole 138 and the other two staking rods each include a reduced diameter tip 145 that is a slip fit with a respective hole 139. The holes 138 and 139 are spaced so that when the connector and cable assembly 12 is in the cavity 98, each of the tips 144 is in alignment with a respective pin 56 of the housing shell 38 and each of the tips 145 is in alignment with a respective pin 66 of the center housing portion 40. The sleeve mount 122 has an outer diameter 150 that is a slip fit into a bore 152 in the ram 18, as best seen in FIG. 2, and has diametrically opposite threaded holes 154 for receiving the screws 28. A peripheral flange 155 abuts the bottom surface of the ram 18 and serves to transmit all loading of the upper tooling assembly 26 to the ram. A central bore 156, being concentric with the diameter 150, has an axis that is coincident with the axis 126 and a diameter sized for a slip fit with the diameter 128 of the die 120 so that the die is free to slide within the sleeve mount 122 along the axis 126. A reduced diameter portion 158 is provided on the upper end of the sleeve mount for clearance within the bore 152. Two opposite cutouts 160 in the end of the reduced diameter portion form two ears 162 that extend upwardly and engage the bottoms of the flanges 136. Each of the two ears is the same width as the shank 134 and flanges 136. The end cap 124 is disk shaped having an outer diameter 163 that is substantially the same as the diameter 158. A groove 164 is formed in a bottom face 166 of the end cap and has a width that is a sliding fit with the shank 134 and the ears 162. The end cap is bolted to the end of the sleeve mount 122 by means of the screws 168 that extend through clearance holes 170 in the end cap and into threaded holes, not shown, in the end of the die 120 on opposite sides of the shank 134. The depth of the groove 164 into the face 166 is greater than the height of the ears 162 and flanges 136 so that the die 120 is free to move axially, with respect to the sleeve mount, a small amount, about 0.10 inch in the present example. An axially disposed bore 172 is formed in the shank 134 and contains a compression spring 174 that extends upwardly into the groove 164 and into engagement with the end cap, as best seen in FIG. 6. The compression spring urges the die 120 downwardly, to the position shown in FIG. 6, so that the flanges 136 are in engagement with the ears 162. Four threaded holes are formed in the end cap 124, each hole being in alignment with a respective staking rod 142. Four set screws 178 are disposed in the threaded holes so that each screw abuts a respective one of the ends of the rods. By turning the set screws one way or the other, the staking rods 142 may be individually adjusted to position their tips with respect to the face 130.

In operation, the lower die assembly 30 is moved along the ways 108 until it is clear of the ram 18. A connector and cable assembly 12 is positioned in the cavity 98 and the lower die assembly moved back to its operating position against the stop block 112. The handle 20 is then actuated causing the ram 18 to move downwardly toward the base surface 16 to the position shown in FIG. 1, where the face 130 of the upper die 120 has moved toward the die nest 92 and into engagement with the outer surface of the housing shell 36. As downward movement of the ram continues, the connector and cable assembly 12 is sandwiched between the upper die 120 and the lower die nest 92 so that they move downwardly toward the base surface 16 as a unit and begin to compress the spring 174 and the four springs 80. As the spring 174 compresses further, the sleeve mount 122, end cap 124, and staking rods 142 continue to move toward the housing shell 36 as the upper die 120 retracts into the bore 156. Movement continues until the two tips 144 engage and stake the pins 66 of the center housing portion 40 and the two tips 145 engage and stake the pins 56 of the housing shell 38. Concurrently, as the springs 80 compress further, the die nest 92 and connector and cable assembly 12 continue to move toward the die support 70 and staking pins 82 and 84. Movement continues until the tips of the staking pins 82 engage and stake the pins 68 of the center housing portion 40 and the tips of the staking pins 84 engage and stake the pins 54 of the housing shell 36. Note that the forces that the staking pins 82 and 84 impart into the pins 68 and 54 are directed to the face 130 and the spring 174, while the forces that the staking rods 142 impart into the pins 66 and 56 are directed to the die nest 92 and the four springs 80. This permits a substantial amount of staking force to be applied to each pin without causing the two housing shell to separate. The four compression springs 80 have a combined force and range of compression that is about equal to the force and range of the single compression spring 174. This prevents bottoming of either the upper or lower die assembly and resulting unbalanced forces that may adversely affect the staking operation. A stop collar 180 is positioned so that it engages the frame 14 and limits the stroke of the ram 18.

I claim:

1. A machine for staking two parts of a multi-part electrical connector together wherein said machine has a frame, a base surface attached to said frame, a ram coupled to said frame and arranged to undergo reciprocating motion along an axis toward and away from said base surface and a staking tooling said staking tooling comprising:

(a) an upper die coupled to and carried within a bore of said ram, movable along said axis within said bore and biased toward said base surface by a first resilient member;

(b) a lower die coupled to said base surface, biased toward said ram by a second resilient member, including a nest formed in a surface of said lower die facing said ram for receiving and positioning said two parts of said electrical connector;

(c) an upper staking pin coupled to and carried by said ram;

(d) a lower staking pin coupled to and stationary with respect to said base surface, said staking tooling arranged so that when said two parts of said electrical connector are assembled and placed in said nest, one part being an upper part facing said ram and the other part being a lower part in engagement with said nest, and said ram moved toward said base surface, said upper die engages said upper part urging said upper die to move within said bore and said lower die to move toward said base surface thereby deflecting said first and second resilient members so that said upper and lower parts of said connector are held therebetween by the urging of said resilient members and said upper staking pin engages and stakes a portion of said lower part of said connector and concurrently said lower staking pin engages and stakes a portion of said upper part of said connector.

2. The machine according to claim 1 wherein said upper die is coupled to said ram by means of a sleeve disposed within an opening in said ram, said sleeve having a closed end and an interior bore having an axis that is parallel to said axis of reciprocation of said ram, and wherein said first resilient member is disposed between said closed end and said upper die and arranged to urge said upper die away from said closed end.

3. The machine according to claim 2 wherein said upper staking pin is fixed with respect to said closed end of said sleeve and extends through an opening in said upper die toward said base surface.

4. The machine according to claim 3 wherein said lower die is coupled to said base surface by means of a lower die support having at least one post extending therefrom toward said ram, said post having an axis that is parallel to said axis of said ram, said post extending through said lower die so that said lower die is free to slide along said post in the direction of said axis of said ram, said second resilient member being disposed between said lower die and said lower die support.

5. The machine according to claim 4 wherein said lower staking pin is fixed with respect to said lower die support and extends through an opening in said lower die toward said ram.

6. The machine according to claim 5 including a base slide attached to said base surface having slide ways, wherein said lower die support includes a pair of flanges on opposite sides thereof that slidingly engage said slide ways so that said lower die support and said lower die are free to slide to a closed position directly in alignment with said ram for staking said two parts of said connector together and to an open position away from said ram for inserting a multi-part connector into said nest to be staked.

7. The machine according to claim 3 wherein said lower die is coupled to said base surface by means of a lower die support having four posts spaced apart and extending therefrom toward said ram, said posts having axes that are parallel to said axis of said ram, said posts extending through said lower die so that said lower die is free to slide along said posts in the direction of said axis of said ram, said second resilient member being four compression springs, one of said springs disposed around each of said posts between said lower die and said lower die support.

8. The machine according to claim 7 wherein said lower die includes four holes formed therethrough and spaced in conformance to the spacing of said four posts, each said hole having a bushing therein, wherein each of said posts extends through a respective said bushing.

9. The machine according to claim 8 wherein said first resilient member is one compression spring having a beginning compressive force approximately equal to the beginning compressive forces of said four compression springs combined.

* * * * *